(12) United States Patent
Fischer (10) Patent No.: US 8,438,740 B2
(45) Date of Patent: May 14, 2013

(54) BEVEL ADJUSTMENT FOR A CIRCULAR SAW

(75) Inventor: Ernest Fischer, Skokie, IL (US)

(73) Assignee: Robert Bosch GmbH, Stuttgart (DE)

( * ) Notice: Subject to any disclaimer, the term of this patent is extended or adjusted under 35 U.S.C. 154(b) by 298 days.

(21) Appl. No.: 12/755,861

(22) Filed: Apr. 7, 2010

(65) Prior Publication Data

US 2011/0247222 A1    Oct. 13, 2011

(51) Int. Cl.
*B27B 5/24* (2006.01)
*B27B 5/36* (2006.01)

(52) U.S. Cl.
USPC ................. 30/376; 30/388; 30/293

(58) Field of Classification Search ............ 30/373–376, 30/388, 390, 391, 293, 286; 188/77 W, 67; 83/581, 477.1
See application file for complete search history.

(56) References Cited

U.S. PATENT DOCUMENTS

| | | | | |
|---|---|---|---|---|
| 1,932,511 A | * | 10/1933 | Clarke | 83/486.1 |
| 3,177,977 A | * | 4/1965 | Deuschle et al. | 188/74 |
| 4,278,032 A | | 7/1981 | Kritske | |
| 5,354,028 A | * | 10/1994 | Kitamura | 248/292.11 |
| 5,433,008 A | | 7/1995 | Barger, Jr. et al. | |
| 6,202,311 B1 | | 3/2001 | Nickels, Jr. | |
| 6,584,917 B2 | * | 7/2003 | Long | 108/147 |
| 6,601,305 B1 | | 8/2003 | Fukuoka | |
| 6,681,493 B2 | | 1/2004 | Mori et al. | |
| 6,691,418 B1 | | 2/2004 | Lewin et al. | |
| 6,951,057 B2 | | 10/2005 | Yoshida et al. | |
| 7,290,342 B2 | | 11/2007 | Hartmann et al. | |
| 7,549,229 B2 | | 6/2009 | Aoyama et al. | |
| 2005/0000338 A1 | | 1/2005 | Wascow | |

FOREIGN PATENT DOCUMENTS

GB    2273905 A    7/1994
JP    2005074861 A    3/2005

OTHER PUBLICATIONS

European Search Report in corresponding European patent application (i.e., EP 11 16 0950), completed Jun. 29, 2011 (6 pages).

* cited by examiner

*Primary Examiner* — Laura M. Lee
(74) *Attorney, Agent, or Firm* — Maginot, Moore & Beck (57) ABSTRACT

A circular saw includes a base plate, a saw blade assembly pivotably mounted to the base plate, and a bevel adjustment assembly operable to adjust the bevel angle of the saw blade assembly by rotation of an axle supported on the base plate. A release mechanism includes two torsion springs each having a coil portion wound around the axle, an anchor leg held in a substantially fixed position relative to the axle and a release leg arranged to move relative to the axle. A manually operable release element is configured to substantially simultaneously move the release leg of each of the torsion springs in a direction to unwind the coil portion of each spring from about the axle.

15 Claims, 5 Drawing Sheets

BEVEL ADJUSTMENT FOR A CIRCULAR SAW

BACKGROUND

The present disclosure relates to circular saws, and particularly to mechanisms for adjusting the bevel angle of the rotary saw blade.

In circular saws it is often desired to adjust the orientation of the rotary cutting blade relative to the workpiece. One adjustment is the depth of cut which relates to the extent to which the blade emerges below the base or foot of the saw. Another adjustment is bevel angle adjustment which controls the angle of the cut. In both adjustments the cutting blade assembly, which typically includes the saw blade, blade guard and handle, is pivotably mounted to pivot relative to the base or foot along perpendicular axes. In many saws, the pivot axis for the depth of cut adjustment is supported by the bevel adjustment mechanism.

In most prior adjustment mechanisms, a locking bolt is loosened to allow pivoting and then re-tightened to lock the saw in the desired orientation. While the locking bolt approach is capable of securely locking the saw blade at any depth of cut or bevel angle it is cumbersome to use, requiring the operator to use both hands simply to manipulate the adjustment mechanism. This can be problematic, especially for mechanisms that permit infinite angular adjustment since the operator must be able to hold the saw at the desired angle while simultaneously tightening the locking bolt. Moreover, if the bolt is not tightened enough the saw cannot hold the desired angle. Conversely, if the bolt is over-tightened it becomes difficult to release for later angular adjustments. Moreover, the locking bolt may wear over time so that it is difficult to loosen and tighten.

SUMMARY

In accordance with one disclosed feature, an angular adjustment mechanism for a circular saw includes an axle defining a pivot axis for the particular angular adjustment. The axle extends through two torsion springs, each spring having an anchor leg that is generally fixed relative to the axle and a release leg that is free to move relative to the axle. Each spring also includes a coil portion that encircles the axle. The torsion springs are biased to a free position in which the diameter of the coil portions is less than the outer diameter of the axle. The torsion springs are thus biased to tightly engage the axle thereby locking the axle.

The adjustment mechanism further includes a release mechanism that is operable to push against the release leg of both springs. The release legs are pushed in a direction to uncoil each spring from about the axle. Thus, for a clockwise wound spring the release leg is pushed in the counter-clockwise direction. As the release leg is pushed, the coil portion gradually uncoils from about the axle, thereby releasing the axle for rotation.

In one feature, one torsion spring is wound clockwise while the other spring is wound counter-clockwise about the axle. In this configuration the two springs are adapted to resist or prevent rotation of the axle in either the clockwise or the counter-clockwise directions. With this combination of springs, the release legs may be situated in the middle and on one side of the axle.

In one aspect, the release mechanism includes an elongated bar with upper and lower arms at one end. The arms define a notch that is sized to receive the axle and torsion springs in their released configuration. The notch has a depth sufficient to allow the arms to pass across from one side to the other of the axle without interfering with the torsion springs. The arms are further arranged to bear against the release leg of each spring as the release bar translates toward the axle.

The release mechanism further includes an actuator that permits single-handed actuation of the mechanism. In one aspect, a spring-biased bell crank is coupled to the end of the release bar opposite from the release arms. The bell crank is initially biased to hold the release bar clear of the release legs of the torsion springs. The bell crank includes a lever that can be manually moved against the biasing force, which causes the release bar to translate toward the axle and causes the arms of the release bar to push the release legs of the torsion springs. In another embodiment, a push button mechanism is provided which bears directly against the release legs of the torsion springs when manually pressed.

In one aspect, an orientation adjustment device for a circular saw having a base plate and a saw blade assembly movably mounted on the base plate, comprises an adjustment assembly operable to adjust an orientation of the saw blade assembly relative to the base plate, the assembly including an axle movably supported on the base plate to adjust the orientation of the saw blade assembly. The orientation adjustment device further comprises a release mechanism, including at least one torsion spring wound around the axle, the torsion spring including a coil portion having a free inner diameter smaller than the outer diameter of the axle, and an anchor leg and a release leg projecting outward from the coil portion. The anchor leg is held in a substantially fixed position relative to the axle while the release leg is arranged to move relative to the axle in a direction to uncoil the coil portion. The release mechanism further includes a manually operable release element supported relative to the axle so that movement of the release element moves the release leg from a first state in which the coil portion is engaged about the axle and a second state in which the coil portion is unwound to a diameter greater than the diameter of the axle.

In one feature, the manually operable release element includes an elongated bar supported for movement relative to the base plate, the elongated bar having an arm at one end configured to engage the release leg. The elongated bar may be slidably supported on the base plate. A lever may be provided having a manually engageable end and an opposite end connected to the elongated bar in which the lever is pivotably supported on the base plate so that rotation of the lever moves the elongated bar toward and away from the axle. A biasing element may be engaged to the lever and configured to bias the lever to move the elongated bar away from the axle.

In certain embodiments, the release mechanism includes two torsion springs each having a coil portion wound around the axle, an anchor leg held in a substantially fixed position relative to the axle and a release leg arranged to move relative to the axle. The release element is configured to substantially simultaneously move the release leg of each of the two torsion springs in the direction to unwind the coil portion. When the release element includes an elongated bar, the bar may include two arms at one end configured to substantially simultaneously engage the release leg of each of the two torsion springs.

In a further aspect, the two torsion springs are wound in opposite directions relative to each other about the axle. In one embodiment, the release leg of each of the two springs projects from the coil portion thereof in substantially opposite directions relative to each other. In another embodiment, the release legs project from their respective coil portions in substantially the same direction relative to the axle. In this embodiment, the manually operable release element may include a push button supported for movement in the same direction relative to the axle, the push button configured to substantially simultaneously engage the release leg of each of the two springs when the push button is moved in the same direction.

DETAILED DESCRIPTION

The present disclosure relates to an adjustment mechanism for a circular saw. While the mechanism is shown and described for use in bevel angle adjustment, the mechanism could be incorporated into the depth of cut adjustment.

Figure 1:
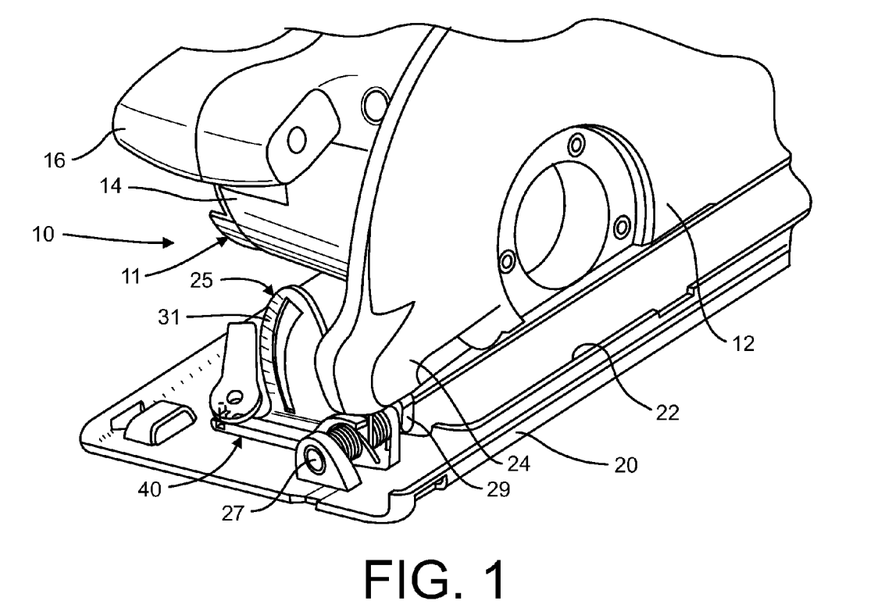
FIG. 1 is a perspective view of a portion of a fixed pivot circular saw showing the bevel adjustment mechanism and the release mechanism according to one embodiment.

A circular saw 10 shown in FIG. 1 includes a saw blade assembly 11 pivotably mounted to a base plate 20, the assembly including a saw blade (not shown), a blade guard 12 protecting the saw blade, a motor housing 14 carrying a motor (not shown) and a handle 16. The pivotably mounted saw blade assembly is arranged to pivot about a pivot hub 24 that is mounted to a bevel angle adjustment assembly 25. The saw blade assembly 11 is further mounted so that the rotary cutting blade extends through the slot 22 during operation.

Figure 2:
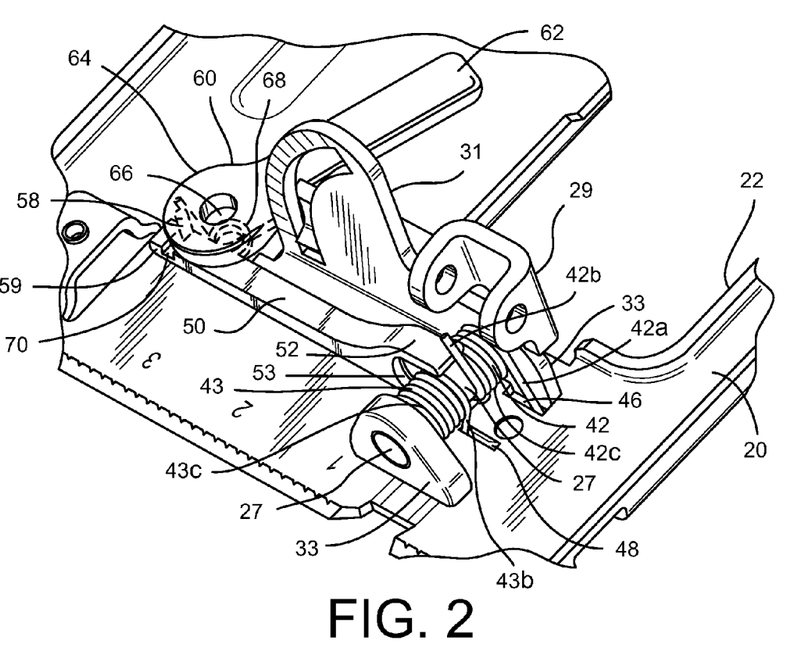
FIG. 2 is a top perspective view of a portion of the bevel adjustment mechanism and the release mechanism shown in FIG. 1.

The bevel adjustment assembly includes an axle 27 to which the pivot hub 24 is mounted, such as by way of pivot mount 29 (FIG. 2). The axle 27 is rotatably supported by two bearing mounts 33 fastened to the base plate 20. The bevel adjustment assembly further includes a guide plate 31 that guide the pivoting of the mechanism and provides a visual indicator to the operator of the bevel angle. As thus far described, the saw 10 and bevel adjustment assembly 25 may be generally configured as is known for conventional circular saws.

According to one feature, the bevel adjustment assembly 25 includes a release mechanism 40 that is permits single-handed operation to release and lock the bevel pivot. The release mechanism includes a pair of torsion springs 42, 43 disposed on the axle 27 between the bearing mounts 33 supporting the axle. Each spring includes an anchor leg 42a, 43a, respectively, that is anchored relative to the axle. For instance, the anchor leg 42a of the spring 42 may be disposed within an anchor hole 46 defined in the base plate 20, as shown in FIG. 2. The anchor leg 43a of the spring 43 may be similarly anchored to the base plate. Alternatively, the anchor legs may be configured to engage an adjacent bearing mount 33, or may be anchored in another manner that prevents the anchor legs 42a, 43a from moving as the torsion springs 42, 43 are coiled and uncoiled, as described herein.

Figure 3:
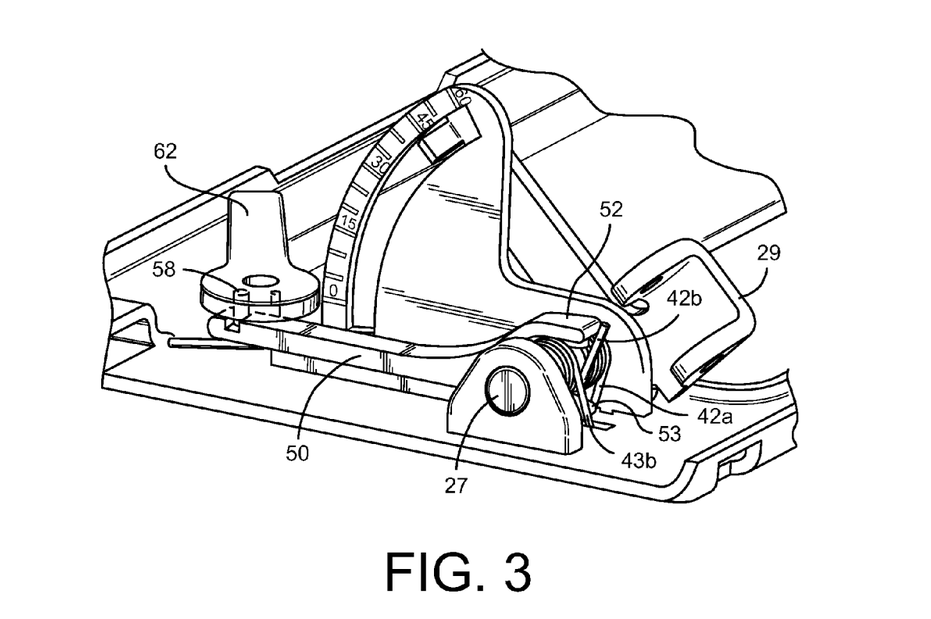
FIG. 3 is a side perspective view of the bevel adjustment mechanism and the release mechanism shown in FIG. 2.
Figure 4:
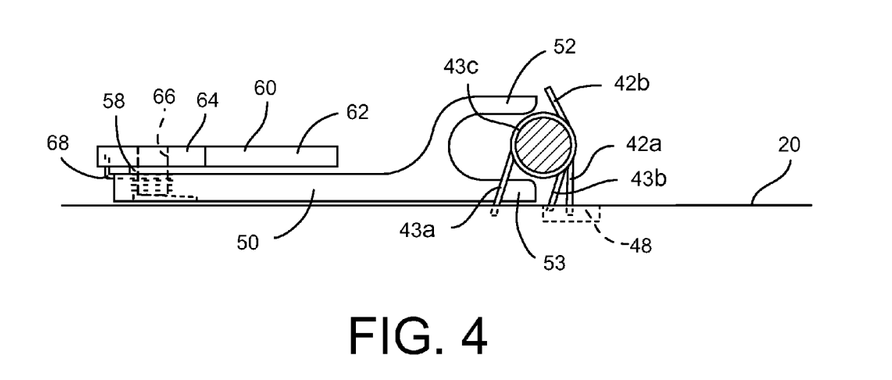
FIG. 4 is a side view of the release mechanism shown in FIGS. 1-3, with the mechanism in a first non-actuated state.
Figure 5:
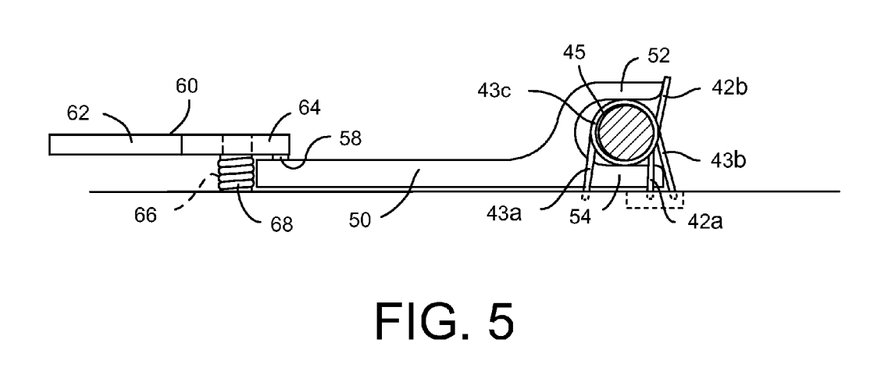
FIG. 5 is a side view of the release mechanism shown in FIGS. 1-3, with the mechanism in a second actuated state.

Each spring also includes a free leg or release leg 42b, 43b, as best shown in FIGS. 4-5. The release legs project outward from the respective coil portions 42c, 43c that encircle the axle 27. The release legs 42b, 43b project a sufficient distance outside the coil portions so that the legs are easily accessible. As shown in FIGS. 2-5, the torsion springs 42 and 43 are arranged to oppose each other. In other words, the torsion spring 42 may be coiled counter-clockwise about the axle (as viewed along the axis of the axle in FIGS. 4-5), while the other spring 43 is coiled clockwise. With this arrangement of the springs the two anchor legs 42a, 43a may be situated at the outboard position on the axle—i.e., immediately adjacent the bearing mounts 33. Likewise, the release leg 42b, 43b may then be positioned next to each other in the middle of the axle 27, as shown in FIGS. 1-3. Furthermore, given the opposing orientation of the springs, the release legs also extend in opposite directions from their respective coils, with the release leg 42b projecting upward and the release leg 43b projecting downward. In order to minimize the prominence or height of the release mechanism 40, the downward projecting release leg 43b may reside within a slot 48 formed in the base plate, as shown in FIGS. 2 and 4.

Each spring has a free configuration in which the inner diameter of the coil portion 42c, 43c is smaller than the outer diameter of the axle 27. This smaller coil free diameter causes the torsion springs 42, 43 to lock or clamp onto the axle as the springs attempt to return to their free state when mounted on the axle. This action of the torsion springs thus effectively locks the axle against rotation any direction when the anchor legs 42a, 43a are fixed to the base plate 20. The opposite orientation of the two springs (counter-clockwise for spring 42 and clockwise for spring 43) ensures that the clamping force will be applied regardless of whether the axle subject to a clockwise or counter-clockwise torque. The use of two springs also allows the springs have a smaller rod diameter to generate the same clamping force as a single larger rod diameter spring.

As is known, when the torsion springs are rotated counter to their coil direction the inner diameter of the coil increases. Thus, when the release leg 42b of the counter-clockwise wound spring 42 is moved clockwise, the coil portion 42c unwinds and the inner diameter increases. Similarly, the coil portion 43c of the spring 43 unwinds when the release leg 43b is moved counter-clockwise. For example, as shown in FIG. 5, when the spring 42 is unwound, the unwinding or expansion of the coil portion 42c creates a gap 45 between the spring and the axle 27. This gap is sufficient to release the clamping force from the axle, allowing the axle to be rotated. When rotation of the axle 27 is permitted, the bevel adjustment assembly 25 can be actuated to change the bevel angle of the power saw 10.

The release mechanism 40 disclosed herein provides a means to unwind the two torsion springs 42, 43 with a one-handed manual action. In particular, the mechanism includes a manually operable release element, which in this embodiment is a release bar 50 that is slidably disposed on the base plate 20, as shown in FIGS. 1-5. As best seen in FIGS. 4-5, the bar 50 includes an upper arm 52 and a lower arm 53. The upper arm 52 is aligned to pass over the axle 27 and springs 42, 43, while the lower arm 53 is aligned to pass underneath the axle and springs. The arms define a generally U-shaped slot 55 that envelops a portion of the axle and spring. The slot 55 is sized to accommodate the springs 42, 43 in their expanded or uncoiled states.

The arms 52, 53 are configured to simultaneously contact each release leg 42b and 43b. The legs have a length sufficient to displace the legs from the locking state shown in FIG. 4 to the release state shown in FIG. 5 as the release bar 50 translates toward the axle 27. Displacing the legs 42b, 43b in the direction shown in FIG. 5 causes the coil portion of the two springs to uncoil from around the axle, as described above. When the bar 50 is moved in the opposite direction the biasing force of the torsion springs pulls the legs 42b, 43b back to the locking state shown in FIG. 4.

The release bar 50 may be manually operated to slide the bar toward the axle 27. With this approach, the release bar may be retained within a guide slot on the base plate 20 (not shown) and may include a knob or handle to be grasped to slide the release bar. However, the force necessary to deflect the release legs 42b, 43b against the force of the torsion springs 42, 43 makes such manual movement difficult. Moreover, that force must be held long enough to permit adjustment of the bevel angle, since the torsion springs will attempt to push the release bar back. Consequently, in another feature, a lever arm arrangement is provided to facilitate translation of the release bar 50 against the force of the release legs 42b, 43b of the torsion springs.

As shown in FIGS. 2-5, a bell crank 60 is pivotably mounted to the base plate 20 at a pivot pin 66. The pivot pin 66 is in fixed relation to the axle 27. The bell crank includes a lever 62 that is arranged on the top of the base plate 20 to be manually engaged and pivoted by the operator. The lever 62 is connected to a hub 64 that is mounted on the pivot pin 66. The hub carries a connecting pin 58 radially outboard from the pivot pin and generally diametrically opposite the lever 62. The connecting pin 58 may be fixed in the hub 64 and situated within a slot 70 formed in the end 59 of the release bar 50. The slot 70 allows the connecting pin 58 to slide laterally as the pin pivots at its fixed radius from the pivot pin 66. The connecting pin 58 is sized to seat fully within the slot 70 to prevent its accidental dislodgment. Other configurations of the connecting pin and end 59 of the release bar 50 are contemplated that are capable of translating the pivoting or rotational movement of the connecting pin to the linear translation of the release bar.

In the locked state shown in FIGS. 2 and 4, the bell crank 60 is pivoted inward over the base plate so that the connecting pin 58 is at its farthest distance from the axle 27. This location pulls the release bar 50 away from the axle and torsion springs. In the release state shown in FIGS. 3 and 5, the lever 62 is pulled outward toward the edge of the base plate. This movement rotates the connecting pin 58 toward the axle 27, which pushes the release bar 50 toward the axle. The lever 62 provides a moment arm that is sufficient to overcome the resistance of the torsion springs 42, 43.

The lever is positioned on the base plate 20 for convenient access by the operator when making the bevel angle adjustment and to be clear of the adjustable working components of the saw 10. The ease of accessing the lever 62 allows the operator to actuate the lever with one hand and simultaneously pivot the saw blade assembly with the other hand. Once the components are aligned at the desired bevel angle, the operator simply releases the lever which allows the torsion springs 42, 43 to return to their locking state to lock the axle 27 against rotation. If further adjustment is needed, the operator can actuate the lever again to move the torsion springs 42, 43 to their release state.

The bell crank 60 may be spring biased, such as with a biasing spring 68 engaged between the hub 64 and the base plate 20. The biasing spring is arranged to bias against rotation of the lever 62 from the locked state (FIG. 2) to the release state (FIG. 3). Put another way, the biasing spring 68 biases the release bar 50 to retreat from the axle 27 and the torsion springs 42, 43. Other biasing components may be used to bias the bell crank and release bar, including a biasing element that is connected to the release bar rather than to the bell crank. The biasing component may be incorporated into the interface between the lever and the release bar, such as in the form of a living hinge.

Figure 6:
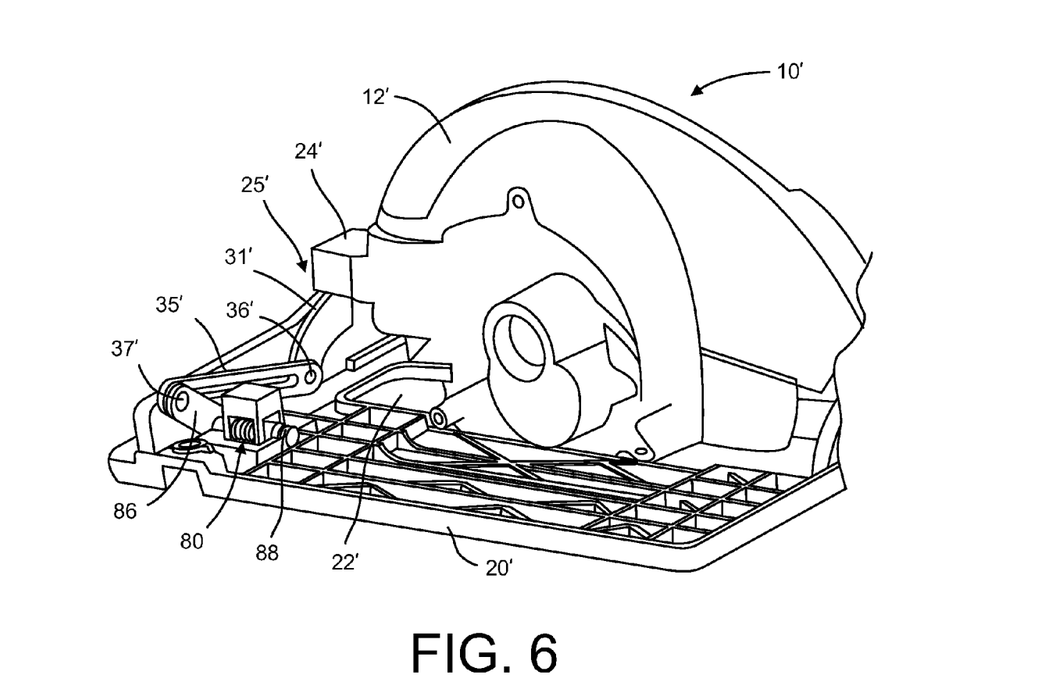
FIG. 6 is a perspective view of a portion of a floating pivot circular saw showing the bevel adjustment mechanism and a release mechanism according to one embodiment.
Figure 7:
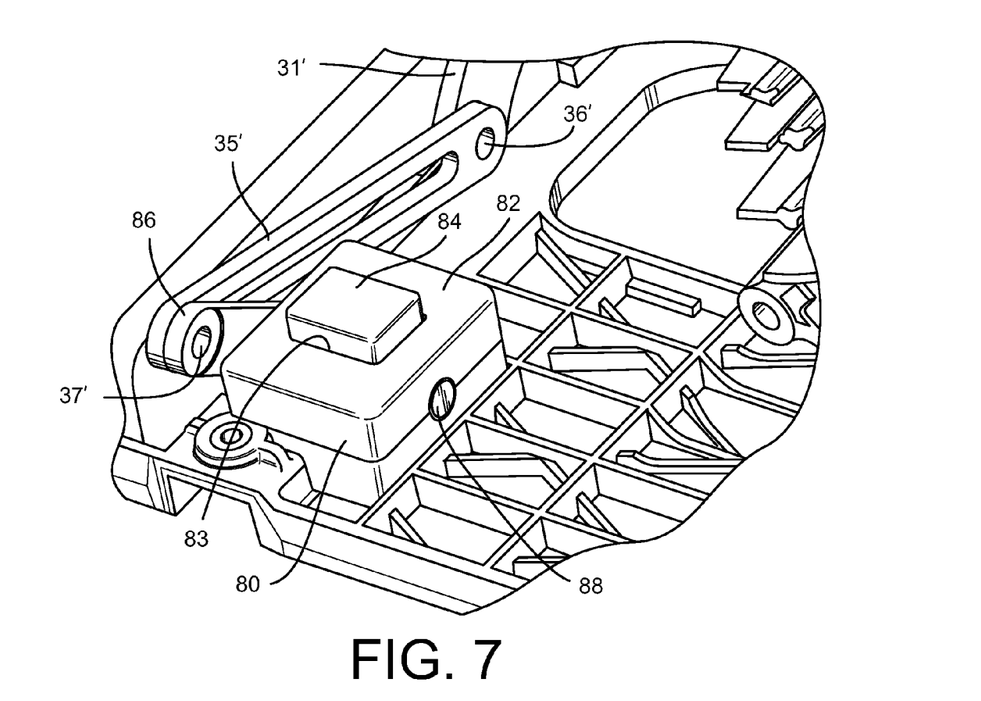
FIG. 7 is a top perspective view of a portion of the bevel adjustment mechanism and the release mechanism shown in FIG. 6.
Figure 8:
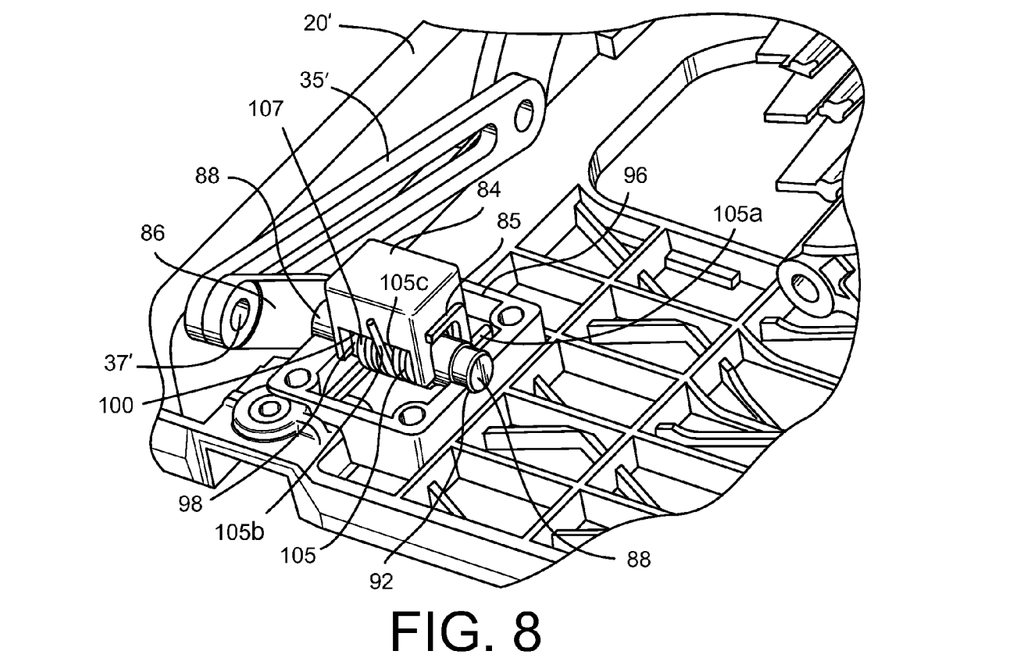
FIG. 8 is a top perspective view of the bevel adjustment mechanism and the release mechanism shown in FIG. 7, with a housing of the release mechanism removed.

The saw 10 illustrated in FIGS. 1-5 employs a conventional pivot axis for the saw blade assembly in which the pivot axis is along the axle 27. In another type of saw, such as the saw 10' shown in FIG. 6, the pivot axis is a "virtual" axis, meaning that the pivot point for the adjustable components floats. The virtual pivot axis approach in effect fixes the pivot axis at the intersection between the saw blade and workpiece. Thus, as shown in FIG. 6, the saw 10' includes a saw guard 12' that is mounted at a pivot hub 24' to a bevel angle adjustment assembly 25'. The assembly includes a guide plate 31' coupled at a pivot point 36' to a linkage 35'. The linkage 35' is coupled at a pivot point 37' to a pivot link 86 that forms part of a release mechanism 80. The pivot link is attached to an axle 88 that is supported on a base 90 (FIGS. 7-8). These elements form a four bar linkage that allows the saw blade assembly to pivot about the blade-workpiece intersection.

Adjustment of the bevel angle for this virtual pivot axis saw 10' depends upon rotation of the axle 88 relative to the base. When the axle is free to rotate the bevel angle can be adjusted, and conversely when the axle is locked the bevel angle is fixed. The release mechanism 80 includes a manually operable release element, which in this embodiment is a push button 84 slidably disposed within a housing 82, as shown in FIG. 7. The housing 82 is mounted to the base 90 and serves to retain the push button. In particular, the push button includes at least one ledge 85 that restrains the push button 84 within the opening 83 in the top of the housing 82.

Figure 9:
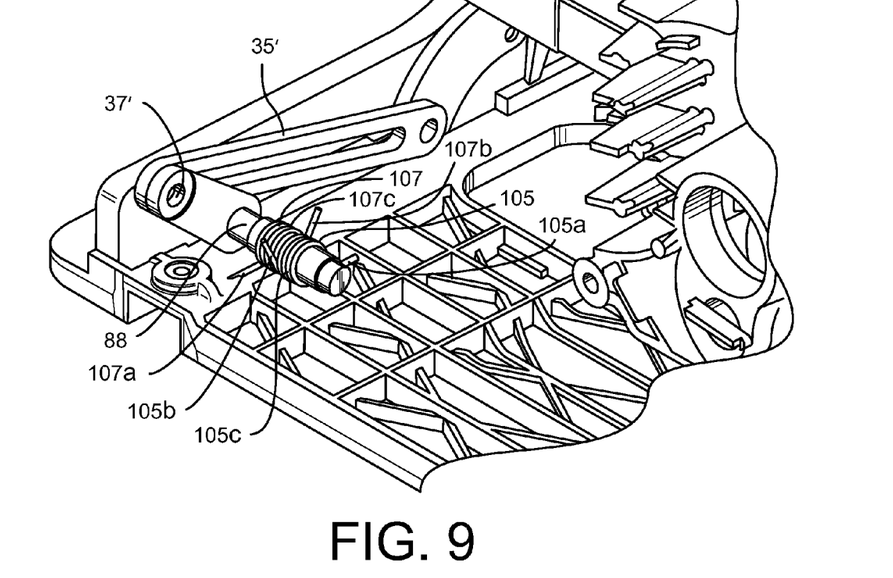
FIG. 9 is a top perspective view of the bevel adjustment mechanism and the release mechanism shown in FIG. 8, with a push button of the release mechanism removed.
Figure 10:
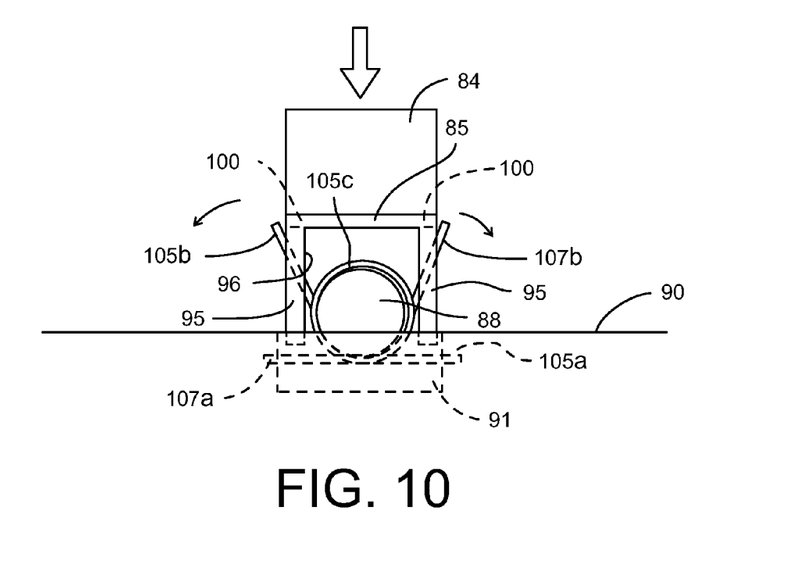
FIG. 10 is an end view of the release mechanism shown in FIGS. 6-9.

Like the release mechanism 40 described above, the release mechanism 80 includes a pair of torsion springs 105, 107 mounted on the axle 88. The torsion springs 105, 107 are sized and oriented the same as, and operate in the same manner as, the springs 42, 43 described above. The springs include anchor legs 105a, 107a, release legs 105b, 107b and coil portions 105c, 107c, as shown in FIGS. 9-10. The anchor legs 105a, 107a bear against the base 90 and may reside within channels formed in the base. The release legs 105b, 107b project upward at a non-perpendicular angle from the axle 88, as best seen in FIG. 10.

The axle 88 is rotatably mounted at each end in an axle support 92 in the base 90. The base defines a cavity 91 beneath the axle 88 to slidably receive the push button 84, and specifically the legs 95 of the push button. The legs 95 define a pair of axle openings 96 so that the push button can slide down over the axle 88, as depicted in FIGS. 8 and 10. The legs 95 further define spring openings 98 through which the release ends 105b, 107b of the torsion springs project. The spring openings 98 form a contact edge 100 that contacts the release ends 105b, 107b to hold the release ends.

In the locked state shown in FIGS. 8 and 10, the push button is displaced upward relative to the axle 88 to its fullest extent, i.e., with the ledge 95 bearing against the housing 82. The torsion springs are then in their locked state with the coil portions 105c, 107c tightly wound about the axle 88. When the push button is depressed in the direction of the arrow in FIG. 10, the edges 100 push against the release portions 105b, 107b of the torsion springs causing the release portions to rotate outward. This rotation uncoils the coil portions 105c, 107c in the manner described above so that the inner diameter of the torsion springs increases to release the axle 88. The legs 95 of the push button 84 advance into the cavity 91 until the downward movement of the push button 84 is stopped by the axle 88.

When the pressure on the push button is released, the spring force of the torsion springs 105, 107 causes the release legs 105b, 107b to pivot inward as the springs seek their biased locking state. This inward movement of the release legs pushes the push button 84 upward into engagement with the housing 82. It can be appreciated when the push button is depressed the axle is free to rotate which allows the operator to adjust the bevel angle of the saw 10', and that when the push button is released the axle is locked. The push button allows the operator to control the release and locking of the bevel angle adjustment assembly 25' with one hand, freeing the other hand to move the saw blade assembly. The spring force of the torsion springs 105, 107 naturally move the push button to its locked state, although an additional biasing component may be provided between the push button 84 and the housing 82 or base 90. For instance, the legs 95 of the push button may bear against a biasing member disposed within the cavity 91 beneath the axle 88.

The release mechanisms 40 and 80 disclosed herein utilize at least one torsion spring mounted over a pivot axle, such as axles 27 and 88. The torsion spring(s) is biased so that the coil portion of the spring is tightly wound about the axle in its neutral state. The release leg of the torsion spring(s) is oriented to be moved by an actuator, such as the release bar 50 or the push button 84. Moving the release leg causes the coil portion of the spring(s) to uncoil resulting in an increase in inner diameter of the spring(s). This increased diameter is sufficient to permit rotation of the axle within the spring(s). In the illustrated embodiments, two opposing torsion spring pairs 42, 43 and 105, 107 are incorporated to provide complete restraint against rotation of the axle in either the clockwise or the counter-clockwise direction. A single torsion spring may be suitable for certain circular saws. Alternatively, more than two torsion springs may be needed to provide greater clamping forces without increasing the prominence of the release mechanism.

In the embodiment shown in FIGS. 1-5, the release bar 50 includes a single set of arms 52, 53 arranged to simultaneously move the release arms 42b, 43b. In this configuration the release arms 42b, 43b are adjacent each other. Alternatively, the release arms may be situated at the outboard ends of the axle 27 and the release bar may be modified so that the arms 52 and 53 are directed to those outboard positions.

In a further modification, the release bar may be configured to pull the release legs, rather than push them as shown in FIGS. 1-5. In this modification, the release legs 42b, 43b may be positioned within slots formed in the upper and lower arms 52, 53 of the release bar 50. The release bar may then be pulled to release the torsion springs. A similar modification may be made to the push button 84 of the release mechanism 80.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance, the present disclosure utilizes the release mechanism in connection with bevel angle adjustment. The release mechanism may be incorporated into other orientation adjustment components that rely upon movement of an axle or shaft to adjust the orientation of the saw blade assembly. For instance, the release mechanism could be adapted for use with a depth of cut feature on a circular saw. The release mechanism could also be adapted for an adjustment that utilizes longitudinal movement of an axle or shaft.

The present disclosure is related to a circular saw with various angular adjustments. The release mechanisms disclosed herein may also be used on other types of saws or tools that incorporate orientation adjustment features.

What is claimed is:

1. An orientation adjustment device for a circular saw having a base plate and a saw blade assembly movably mounted on the base plate, comprising:
   an adjustment assembly operable to adjust an orientation of the saw blade assembly relative to the base plate, the assembly including an axle movably supported on the base plate to adjust the orientation of the saw blade assembly; and
   a release mechanism, including;
      at least one torsion spring wound around said axle, said torsion spring including a coil portion having a free inner diameter smaller than the outer diameter of said axle, and an anchor leg and release leg projecting outward from said coil portion, said release leg including an extending portion terminating at a terminal end, said extending portion including a contact surface disposed between said terminal end and said coil portion, said anchor leg held in a substantially fixed position relative to said axle and said release leg arranged to move relative to said axle in a direction to uncoil said coil portion; and
      a manually operable release element supported relative to said axle so that movement of said release element moves said release leg from a first state in which said coil portion is engaged about said axle and a second state in which said coil portion is unwound to a diameter greater than the diameter of said axle, said manually operable release element including an elongated bar supported for movement relative to the base plate, said elongated bar having an arm at one end configured to engage said contact surface, wherein said elongated bar is slidably supported on the base plate.

2. The orientation adjustment device of claim 1, wherein said manually operable release element further includes a lever, said lever having a manually engageable end and an opposite end connected to said elongated bar at an end opposite said one end, said lever pivotably supported on the base plate so that rotation of said lever moves said elongated bar toward and away from said axle.

3. The orientation adjustment device of claim 2, wherein release element includes a biasing element engaged to said lever and configured to bias said lever to move said elongated bar away from said axle.

4. The orientation adjustment device of claim 2, wherein said lever is part of a bell crank, said bell crank having a hub pivotably mounted to the base plate, said hub including a pin extending therefrom and connected to said elongated release bar.

5. The orientation adjustment device of claim 4, wherein said pin is slidably disposed within a slot defined in said opposite end.

6. The orientation adjustment device of claim 1, wherein:
said release mechanism includes two torsion springs each having a coil portion wound around said axle, an anchor leg held in a substantially fixed position relative to said axle and a release leg arranged to move relative to said axle, said release leg including an extending portion terminating at a terminal end, said extending portion including a contact surface disposed between said terminal end and said coil portion; and
said release element is configured to substantially simultaneously move said release leg of each of said two torsion springs in said direction to unwind said coil portion.

7. The orientation adjustment device of claim 6, wherein said elongated bar includes two arms at one end configured to substantially simultaneously engage said contact surface of said release leg of each of said two torsion springs.

8. The orientation adjustment device of claim 6, wherein said two torsion springs are wound in opposite directions relative to each other about said axle.

9. The orientation adjustment device of claim 8, wherein said release leg of each of said two springs projects from said coil portion thereof in substantially opposite directions relative to each other.

10. The orientation adjustment device of claim 9, wherein said manually operable release element includes an elongated bar supported for movement relative to the base plate, said elongated bar having an upper arm and a lower arm, said arms defining a slot therebetween sized to receive said axle therein, said arms arranged to engage said contact surface of said release leg of a corresponding one of said two springs above and below said axle.

11. The orientation adjustment device of claim 8, wherein said release leg of each of said two springs projects from said coil portion thereof in substantially the same direction relative to said axle.

12. A circular saw comprising:
a base plate defining a slot;
a saw blade assembly pivotably mounted to said base plate with a saw blade extendable through said slot;
an angle adjustment assembly operable to adjust the angle of said saw blade assembly relative to said base plate, said angle adjustment assembly including an axle rotatably supported on said base plate and operatively coupled to said saw blade assembly to adjust the angle of said saw blade assembly; and
a release mechanism, including;
  at least one torsion spring wound around said axle, said torsion spring including a coil portion having a free inner diameter smaller than the outer diameter of said axle, and an anchor leg and a release leg projecting outward from said coil portion, said anchor leg held in a substantially fixed position relative to said axle and said release leg arranged to move relative to said axle in a direction to uncoil said coil portion; and
  a manually operable release element supported relative to said axle so that movement of said release element moves said release leg from a first state in which said coil portion is engaged about said axle and a second state in which said coil portion is unwound to a diameter greater than the diameter of said axle, wherein said release mechanism includes two torsion springs each having a coil portion wound around said axle in opposite directions relative to each other, an anchor leg held in a substantially fixed position relative to said axle and a release leg arranged to move relative to said axle, and said release element is configured to substantially simultaneously move said release leg of each of said two torsion springs in said direction to unwind said coil portion, wherein
said release leg of each of said two springs projects from said coil portion thereof in substantially opposite directions relative to each other; and
said manually operable release element includes an elongated bar slidably supported on said base plate, said elongated bar having two arms at one end configured to substantially simultaneously engage said release leg of each of said two torsion springs.

13. The circular saw of claim 12, wherein said release element further includes a bell crank pivotably mounted on said base plate and connected to an end of said elongated bar opposite said one end, said bell crank having a manually operated lever arranged so that rotation of said lever moves said elongated bar toward and away from said axle.

14. A circular saw comprising:
a base plate defining a slot;
a saw blade assembly pivotably mounted to said base plate with a saw blade extendable through said slot;
an angle adjustment assembly operable to adjust the angle of said saw blade assembly relative to said base plate, said angle adjustment assembly including an axle rotatably supported on said base plate and operatively coupled to said saw blade assembly to adjust the angle of said saw blade assembly; and
a release mechanism, including;
  at least one torsion spring wound around said axle, said torsion spring including a coil portion having a free inner diameter smaller than the outer diameter of said axle, and an anchor leg and a release leg projecting outward from said coil portion, said anchor leg held in a substantially fixed position relative to said axle and said release leg arranged to move relative to said axle in a direction to uncoil said coil portion; and
  a manually operable release element supported relative to said axle so that movement of said release element moves said release leg from a first state in which said coil portion is engaged about said axle and a second state in which said coil portion is unwound to a diameter greater than the diameter of said axle, wherein said release mechanism includes two torsion springs each having a coil portion wound around said axle in opposite directions relative to each other, an anchor leg held in a substantially fixed position relative to said axle and a release leg arranged to move relative to said axle and said release element is configured to substantially simultaneously move said release leg of each of said two torsion springs in said direction to unwind said coil portion;
wherein said release leg projects outward from said coil portion, said release leg including an extending portion terminating at a terminal end, said extending portion including a contact surface disposed between said terminal end and said coil portion, and said manually operable release element includes an elongated bar supported for movement relative to said base plate, said elongated bar having an arm at one end configured to engage said contact surface of said release leg, wherein said elongated bar is slidably supported on said base plate.

15. The circular saw of claim 14 wherein said release mechanism includes two torsion springs each having a coil portion wound around said axle in opposite directions relative to each other, an anchor leg held in a substantially fixed position relative to said axle, and a release leg arranged to move relative to said axle, said release leg including an extending portion terminating at a terminal end, said extending portion including a contact surface disposed between said terminal end and said coil portion; and said release element is configured to substantially simultaneously contact said contact surface to move said release leg of each of said two torsion springs in said direction to unwind said coil portion.

* * * * *